No. 796,251. PATENTED AUG. 1, 1905.
J. B. ROSENSTEIN.
DETACHABLE HANDLE FOR UMBRELLAS.
APPLICATION FILED JAN. 14, 1905.
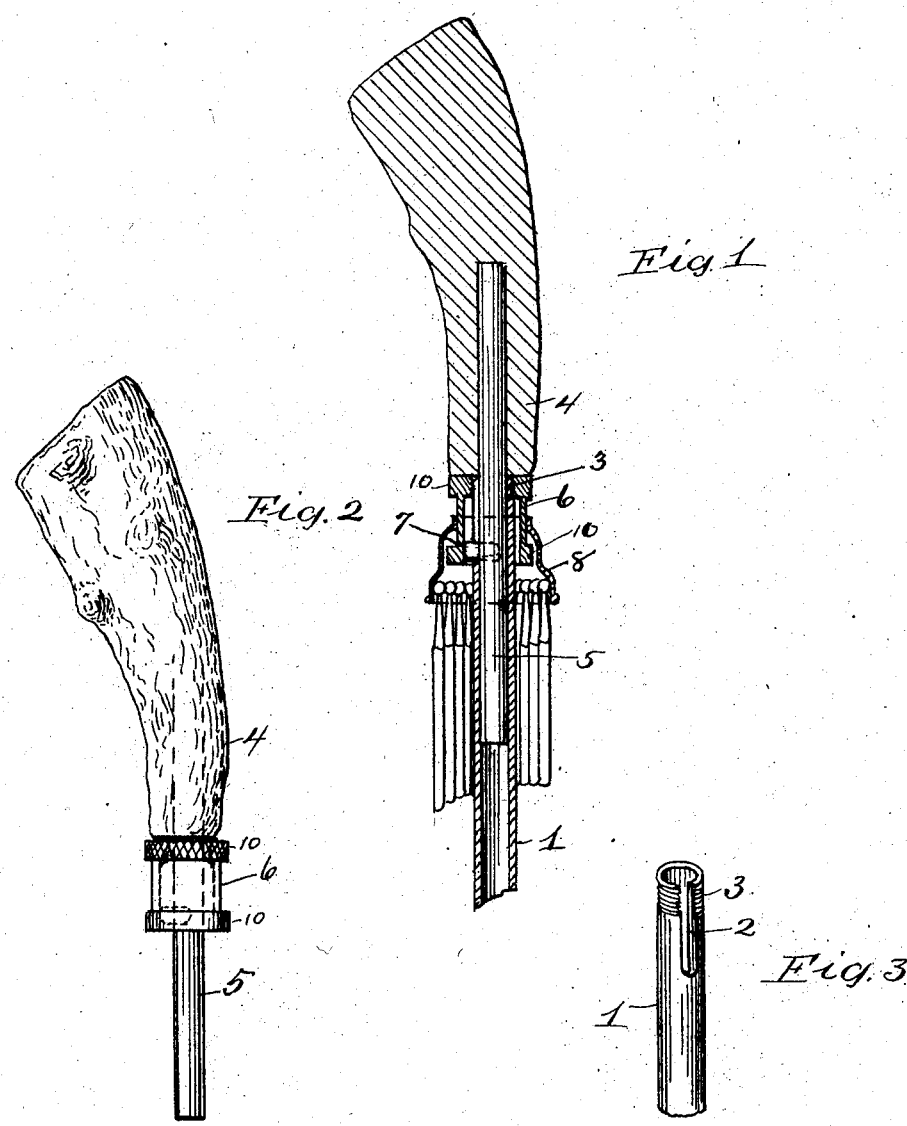

UNITED STATES PATENT OFFICE.

JACOB B. ROSENSTEIN, OF CLEVELAND, OHIO, ASSIGNOR TO NATIONAL UMBRELLA COMPANY, OF CLEVELAND, OHIO.

DETACHABLE HANDLE FOR UMBRELLAS.

No. 796,251.      Specification of Letters Patent.      Patented Aug. 1, 1905.

Application filed January 14, 1905. Serial No. 241,029.

*To all whom it may concern:*

Be it known that I, JACOB B. ROSENSTEIN, a citizen of the United States, and a resident of Cleveland, county of Cuyahoga, State of Ohio, have invented certain new and useful Improvements in Detachable Handles, of which I hereby declare the following to be a full, clear, and exact description, such as will enable others skilled in the art to which it appertains to make and use the same.

The objects of the invention are to provide means for detachably securing the handle to an umbrella, so that the umbrella dealer can suit the taste of a large variety of customers and an umbrella can be provided with any one of a large selection of handles without retaining as large a number of umbrellas in stock as would otherwise be necessary.

A further object is to permit of retaining a valuable handle and applying it to a new umbrella when the old umbrella is worn out or accidentally destroyed.

A further object in temporarily shortening the umbrella is found in the ease with which it can be packed in a trunk for convenience in traveling.

To accomplish these results, I employ the form of construction of umbrella-stick and nut and handle and the coupling device therefor, as hereinafter described, shown in the accompanying drawings, and specifically pointed out in the claims.

In the accompanying drawings, Figure 1 is a vertical section of the handle and upper portion of the umbrella. Fig. 2 is a detail view of the handle portion, and Fig. 3 is a detail view of the upper end of the umbrella-stick.

In the views, 1 is the umbrella-stick, which is seen to be formed of small steel tubing. In the upper end of this tube is cut a longitudinal slot 2, open at the upper end. The exterior surface of this extremity of the tube is screw-threaded at 3. In the handle 4 is inserted a steel rod 5 of the proper diameter to fit snugly within the tubular stick 1, and thus form a rigid connection. Upon this rod is loosely sleeved the nut 6, adapted to screw upon the extremity of the umbrella-stick at 3. This nut is prevented from coming off the rod by means of a pin or key 7 inserted in the rod between the nut and the end of the rod.

It will be seen that when the rod 5 is inserted within the umbrella-stick and the pin 7 is inserted in the slot 2 the parts are rigid and the handle cannot turn in the umbrella-stick. Then to fasten the parts securely together it is only necessary to screw the nut tightly upon the end of the umbrella-stick, when the handle will be brought down snugly against the end of the stick and the parts will be locked together.

Slidingly mounted upon the nut is shown the tip-cup 8, by means of which the umbrella-tips are confined. An annular rib 10 at each end of the nut prevents this ferrule from coming off.

Having described the invention, what I claim as new, and desire to secure by Letters Patent, is—

1. The combination with a tubular umbrella-stick, provided with an exteriorly-screw-threaded upper extremity, and a longitudinal open slot, of a handle therefor, a metal rod therein adapted to fit closely the inner surface of the tubular stick, a pin on the rod adapted to enter said open slot in said tubular stick, and a nut upon the rod, adapted to screw upon the end of the said stick, and retained in position by said pin, substantially as described.

2. The combination with a tubular umbrella-stick, provided with a screw-thread upon its exterior surface at the upper end, and a longitudinal open slot, of a handle provided with an extended rod adapted to enter the said stick, a nut adapted to engage said screw-threaded stick and sleeved over the said rod closely adjacent to the handle, a pin upon the rod adapted to enter said slot and to also retain the nut upon the rod, and a tip-cup slidably sleeved upon the nut, substantially as described.

In testimony whereof I hereunto set my hand this 10th day of January, 1905.

JACOB B. ROSENSTEIN.

In presence of—
    GEO. S. COLE,
    WM. M. MONROE.